No. 865,885. PATENTED SEPT. 10, 1907.
A. GUDMUNSEN.
BEET TOPPER.
APPLICATION FILED DEC. 1, 1906.

WITNESSES:
E. F. Stewart
C. Bradway

Abraham Gudmunsen,
INVENTOR

By C. A. Snow & Co.
ATTORNEYS

UNITED STATES PATENT OFFICE.

ABRAHAM GUDMUNSEN, OF LEHI, UTAH, ASSIGNOR OF ONE-HALF TO GEORGE AUSTIN, OF LEHI, UTAH.

BEET-TOPPER.

No. 865,885.   Specification of Letters Patent.   Patented Sept. 10, 1907.

Application filed December 1, 1906. Serial No. 345,874.

*To all whom it may concern:*

Be it known that I, ABRAHAM GUDMUNSEN, a citizen of the United States, residing at Lehi, in the county of Utah and State of Utah, have invented a new and useful Beet-Topper, of which the following is a specification.

This invention has relation to beet toppers and it consists in the novel construction and arrangement of its parts as hereinafter shown and described.

The object of the invention is to provide a device which is adapted to be drawn along a row of plants and which will remove the tops from the same. The device is provided with a vertically disposed disk blade upon a roller or side rollers which engages the root and holds the same firmly in the ground. The said vertically disposed blade is followed by a horizontally disposed blade which is adapted to cut the crown from the beet while the said beet is being held by the vertically disposed blade. The topping blade is horizontally disposed but is located at a higher altitude than the crown removing blade.

Figure 1:
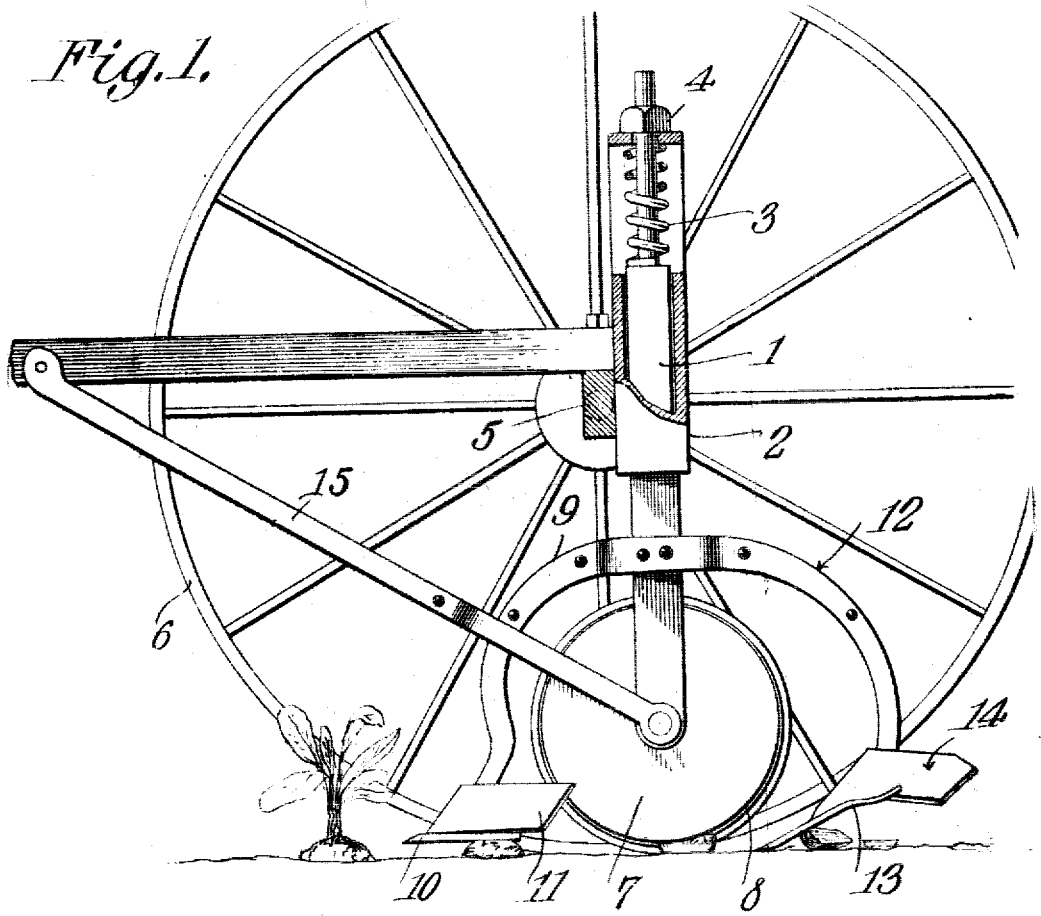
Figure 2:
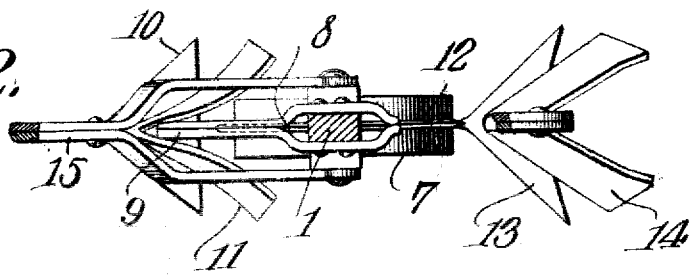

In the accompanying drawing:—Figure 1 is a vertical sectional view of the beet topper showing the cutting blades in side elevation. Fig. 2 is a top plan view of the cutting blades.

The beet topper comprises the standard 1, the upper end of which operates in the sleeve 2. The coil spring 3 surrounds the upper portion of the standard 1 and has a tendency to maintain the said standard in its lowermost position. The downward movement of the standard 1 is limited by the nut 4 which is screw threaded upon the upper end of the said standard. The sleeve 2 may be mounted upon a cross bar 5 or other suitable support which in turn is supported by the ground wheels 6. The implement is preferably provided with four standards each of which is adapted to pass over a row of beets and each of which is provided with top and crown removing blades as will be hereinafter described. The roller 7 is journaled at the lower end of the standard 1 and is provided upon its periphery with the vertically disposed annular blade 8. The arm 9 is attached at its upper end to the standard 1 above the roller 7 and extends over the forward portion of the said roller and is provided at its lower end with a horizontal blade 10 which is of triangular configuration. The said arm 9 may depend from any other part of the implement. The wings 11 are attached to the arm 9 just above the blade 10. The rear ends of the said wings extend back along the opposite sides of the roller 7. The arm 12 is attached at its upper end to the standard 1 at a point above the roller 7 and extends down behind the said roller and is provided at its lower end with a horizontal blade 13 which is of quadrilateral configuration with a point located at its forward end. The wings 14 are attached to the arm 12 just above the blade 13. The blade 13 is located substantially on a level with a tangent extending horizontally from the periphery of the blade 8 while the blade 10 is located above such a tangent. The link 15 is pivoted at its lower end to the transverse axis of the roller 7 and at its upper end is pivotally attached to the frame of the implement as shown.

In practice the parts operate as follows: The implement is drawn along the rows of beets, the horizontal blade 10 engages the tops of the plants laterally and severs them from the root. The wings 11 cast the tops to each side of the roller 7. The roller or rollers 7 travel upon the ground and the blade 8 cuts into the ground and into the tops of the roots. Thus the said blade firmly retains the root in position in the ground and the blade 13 following immediately after severs the crown from the root while it is confined by the blade 8. The wings 14 throw the crowns to one side or the other of the row of plants and the implement above described may be followed by a beet harvesting plow which will bring the roots to the surface and separate them from the soil in the usual manner.

Having described my invention what I claim as new and desire to secure by Letters Patent is:—

1. A beet topper comprising a wheel mounted cross-bar, a vertically disposed sleeve attached to said bar, a vertically movable standard located in said sleeve, a vertically disposed cutter journaled at the lower end of the standard, arms attached to said standard and extending one in front and the other behind the same and blades carried by said arms.

2. A beet topper comprising a wheel mounted cross-bar, a vertically disposed sleeve attached to said bar, a vertically movable spring actuated standard located in said sleeve, a vertically disposed cutter journaled at the lower end of the standard, arms attached to said standard and extending one in front and the other behind the same and blades carried by said arms.

In testimony that I claim the foregoing as my own, I have hereto affixed my signature in the presence of two witnesses.

ABRAHAM GUDMUNSEN.

Witnesses:
JAMES BROWN,
WM. ASHER.